United States Patent Office 3,219,716
Patented Nov. 23, 1965

3,219,716
PRODUCTION OF OLIGOMERS OF
BUTADIENE-(1,3)
Dietmar Wittenberg, Mannheim, Hans Lautenschlager, Ludwigshafen (Rhine), Nikolaus von Kutepow, Karlsruhe-Rueppurr, and Fritz Meier and Hubertus Seibt, Ludwigshafen (Rhine), Germany, assignors to Badische Anilin- & Soda-Fabrik Aktiengesellschaft, Ludwigshafen (Rhine) Germany
No Drawing. Filed Aug. 21, 1962, Ser. No. 218,448
Claims priority, application Germany, Aug. 26, 1961,
B 63,795
4 Claims. (Cl. 260—666)

This invention relates to a process for the production of oligomers of butadiene-(1,3). More specifically it relates to the use of a modified catalyst in such a process.

Recently methods have become known by which butadiene-(1,3) can be converted into mainly cyclic oligomers. Cyclododecatriene-(1,5,9) and cyclooctadiene-(1,5) are such conversion products. They are suitable for the production of polyamides, for example by hydrogenating them, reacting the resultant saturated hydrocarbons with nitrosyl chloride to form cyclooctanone oxime or cyclododecanone oxime and converting these substances into capryllactam or laurolactam by Beckmann rearrangement.

Belgian patent specification No. 598,363 describes a catalyst system for oligomerizing butadiene-(1,3) which is formed from a compound of a metal of the iron group of the Periodic System of Elements and an organometallic compound or a metal hydride in the presence of an electron donor. With nickel-containing catalysts of this type it is possible to dimerize butadiene-(1,3) to cyclooctadiene-(1,5) in a 70% yield. The yield can be increased to 90% by diluting the butadiene-(1,3) with an equal amount of butene-(1).

It is an object of the present invention to provide a process by which oligomers of butadiene-(1,3) can be prepared in better yields than hitherto. It is a further object of the invention to provide a process which permits the production of cyclooctadiene-(1,5) with higher selectivity. It is another object of the invention to provide a process for the production of cyclooctadiene-(1,5) by dimerizing butadiene-(1,3) which permits higher reaction rates than hitherto. Further objects and advantages of the invention will be evident from the following description.

In accordance with this invention, the said objects and advantages are accomplished by reacting butadiene-(1,3) in the presence of a catalyst formed by mixing:

(a) A compound of a metal of the iron group of the Periodic System of Elements;
(b) A compound of an element of Group IA, IIA, IIB or IIIA of the Periodic System which contains at least one hydrogen atom attached direct to the element and/or at least one carbon atom attached direct to the element; and
(c) A phosphite having at least one aryl radical substituted in o-position to the oxygen atom attached to the phosphorus atom.

References to groups of the Periodic System are references to that Periodic Chart of the Elements in which the transition elements are in the B groups whereas the other elements from the A groups.

Pure or commercial butadiene and also gas mixtures containing butadiene to an appreciable extent, i.e., more than 30%, may be reacted according to the process.

The preferred catalysts contain cobalt or nickel, especially nickel. Suitable compounds of metals of the iron group of the Periodic System are especially the salts of organic and inorganic acids in which the metals are present in divalent or trivalent form. Among suitable salts are: nickelous chloride, nickelous bromide, nickelous iodide, nickelous carbonate, nickelous acetate, nickelous benzoate, nickelous sulfate, nickelous nitrate, nickelous formate, nickelous oxalate, cobaltous chloride, cobaltic chloride, cobaltous acetate, cobaltic fluoride, cobaltous sulfate, cobaltous nitrate, ferrous chloride, ferrous sulfate, ferrous nitrate and ferrous carbonate. Especially good results are achieved by the use of chelate complexes of suitable metals. Examples of these are nickel acetylacetonate, nickel acetoacetate, nickel benzoylacetonate, nickel dimethylglyoxime, cobaltic acetylacetonate, cobaltous acetylacetonate, ferric acetylacetonate, cobaltous dithiocarbamate and nickelous xanthate. Other suitable compounds of metals of the iron group of the Periodic System are oxides, hydroxides and sulfides, such as nickelous oxide, nickelous hydroxide, nickelic oxide, nickelic hydroxide, nickelous sulfide, cobaltic hydroxide, cobaltocobaltic oxide, cobaltous sulfide, ferrous oxide and ferric hydroxide.

Of the said compounds of Groups IA, IIA, IIB and IIIA of the Periodic System of Elements, those of lithium, sodium, potassium, magnesium, calcium, boron and aluminum are preferred for reasons of accessibility. Examples of suitable compounds are lithium hydride, sodium hydride, calcium hydride, aluminum hydride, phenyl sodium, phenyl lithium, tertiary butyl lithium, benzyl potassium, phenyl magnesium chloride, ethyl magnesium bromide, diethyl magnesium, triethyl aluminum, diisobutyl aluminum hydride, phenyl aluminum sesquichloride, diethyl aluminum chloride, beryllium diethyl, magnesium diethyl, diborane, triethyl boron, diethyl zinc and diethyl cadmium.

It is also possible to use complex compounds which contain a plurality of the said elements, for example one of Group IA and one of Group IIIA. Such compounds are for example lithium aluminum hydride, sodium ethyl ethoxy aluminum hydride and lithium borohydride.

Of the phosphites, the triaryl phosphites with three identical aryl substituents are preferred. The aryl substituents are advantageously mononuclear to binuclear, i.e., phenyl, naphthyl or diphenylyl radicals. They may have hydrocarbon structure or may bear one or two inert substituents, such as halogen, alkoxy with one to four carbon atoms, or aryloxy with six to eight carbon atoms.

It is an essential condition that at least one aryl radical of the phosphite is substituted in o-position in relation to the oxygen atom attached to the phosphorus atom. The substituents may be for example hydrocarbon radicals having one to six carbon atoms, alkoxy radicals with one to four carbon atoms, halogen atoms and/or aryloxy radicals with six to eight carbon atoms. Furthermore the substituent together with the carbon atom which it substitutes and the carbon atom in 3-position in relation to the oxygen atom, may form a six-membered carbocyclic ring, as is the case for example with α-naphthol. Examples of suitable phosphites are: tri-(o-tolyl)phosphite, tri-(2,4-dimethylphenyl)phosphite, tri-(2,6-dimethylphenyl)phosphite, tri-(o-isopropylphenyl)phosphite, trithylmyl phosphite (tri-(2-isopropyl-5-methylphenyl) phosphite), tri-(2,4-diisopropylphenyl)phosphite, tri-(o-octylphenyl) phosphite, tri-(o-diphenylyl)phosphite, tri-(2-methoxyphenyl)phosphite, tri-(2-methyl-5-isopropylphenyl)phosphite, tri-(2,4-ditertiary-butylphenyl)phosphite, tri-(2-isobutylphenyl)phosphite, tri-(α-naphthyl) phosphite, tri-(o-chlorophenyl)phosphite, tri-(o-bromophenyl)phosphite, tri-2,4-dichlorophenyl)phosphite, tri-(2,6-dichlorophenyl)phosphite, tri-(2,4-dimethoxyphenyl) phosphite, tri-(2-butoxyphenyl)phosphite, o-tolyl-diethyl phosphite, diphenyl-o-diphenylyl phosphite, tri-o-cyclohexylphenyl phosphite, o-phenylene-o-tolyl phosphite, trio-phenylene diphosphite [(o-C$_6$H$_4$O$_2$)$_3$P$_2$] and 2-o-methylphenoxyl-1,3,2,-dioxaphospholane

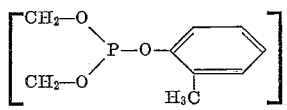

The compound of the metal of the iron group and the phosphite are preferably used in a molar ratio between 1:1 and 1:6, advantageously between 1:1 and 1:4. The compound of the metal of the iron group and the compound specified under (b) above are in general used in a molar ratio between 1:0.5 and 1:20. The optimum ratios for a given system may readily be determined.

The catalyst is prepared by mixing the components in any sequence. The temperature during mixing is between —50° and +100° C. In some cases it is advantageous to raise the temperature for a short time, for example to 250° C.

The catalyst is advantageously prepared in an inert solvent. Suitable solvents are for example aliphatic, cycloaliphatic and aromatic hydrocarbons and ethers, such as hexane, heptane, cyclohexane, benzene, cyclooctene, hydrocarbon mixtures boiling between about 60° and 200° C. and obtained from petroleums, tetrahydrofurane and diisopropyl ether. It is also possible to use as solvent the reaction product itself. The process may therefore be carried out for example in cyclooctadiene-(1,5) or cyclododecatriene-(1,5,9). It is recommendable to use carefully purified and anhydrous solvents. Mixtures of the said solvents may obviously also be used with good success. The solvent is used in general in an amount which is 0.01 to 10 times that of the butadiene-(1,3) to be reacted.

Only small amounts of catalyst are required for the oligomerization of butadiene-(1,3). The amounts calculated as nickel in general are between 0.001 to 0.1 times that of butadiene-(1,3). The process is carried out at a temperature between 0° and 250° C., preferably between 50° and 150° C. The process may be carried out in the inert solvent which has been used in the production of the catalyst.

The reaction may be carried out at atmospheric pressure, but it is advantageous to use increased pressure as determined by the vapor pressure of the butadiene-(1,3) and the solvent used at the reaction temperature. Pressures up to 30 atmospheres are suitable.

In order to carry out the process, the components from which the catalyst is made up are brought together, advantageously in a pressure vessel and in the solvent chosen for the reaction. Then butadiene-(1,3) is added and the mixture heated to the reaction temperature for some time.

In another method of operation the butadiene-(1,3) is supplied to the reaction mixture at the rate at which it is used up by the reaction. If care is taken, when working in this way, that unreacted butadiene-(1,3) is always present in the reaction mixture and that the reaction is stopped soon after all of the butadiene-(1,3) has been added, cyclooctadiene-(1,5) is obtained as the main product besides varying quantities of cyclooctadiene-(1,3).

The reaction mixture is advantageously worked up by distillation. It is advantageous to add to the batches, prior to distillation, a small amount of water or a low molecular weight alcohol, such as methanol, to destroy the catalyst.

The invention is illustrated in, but not limited to, the following examples in which the parts are by weight.

EXAMPLE 1

180 parts of benzene, 5 parts of cobaltic acetylacetonate, 10 parts of butadiene-(1,3), 4.3 parts of aluminum triethyl and 5 parts of tri-(o-tolyl)phosphite are charged to a pressure vessel consecutively and then butadiene is passed in at 80° C. and under a gauge pressure of 1.5 atmospheres. 170 parts of butadiene is reacted within seven hours. By distilling the reaction mixture, 160 parts of a mixture of C$_8$H$_{12}$-hydrocarbons having the boiling point 120° C. to 150° C. (760 mm. Hg) is obtained. According to the gas chromatographic analysis it consists of 1.5% of 3-methyl-heptatriene-(1,4,6), 46% of 1-vinylcyclohexene-(3) and 51% of cyclooctadiene (1.5). 10 parts of a colorless oil having the boiling point 70° to 120° C. (5 mm.) is also obtained. 10 parts of a viscous oil remains together with the catalyst as distillation residue. The yield of cyclooctadiene-(1,5) is 46% of the theory with reference to reacted butadiene.

If the tri-(o-tolyl)phosphite be replaced by the equivalent amount of triphenyl phosphite, only 0.9% of cyclooctadiene-(1,5) is obtained under otherwise identical conditions.

EXAMPLE 2

Butadiene-(1,3) is passed at 90° C. at atmospheric pressure into a catalyst mixture of 150 parts of toluene, 2.6 parts of nickel acetylacetonate, 7 parts of tri-(o-tolyl) phosphite and 2.6 parts of ethoxy aluminum diethyl. 75 parts of butadiene is absorbed within thirty minutes. Working up by fractional distillation gives 69 parts of cyclooctadiene-(1,5) having the boiling point 150° to 151° C., a yield of 92%. 3.7 parts of 4-vinylcyclohexene(1) (a 5% yield) is isolated as a byproduct.

When working under analogous conditions but using tri-(p-tolyl)phosphite, the yield of cyclooctadiene-(1,5) is only 72%.

EXAMPLE 3

A catalyst mixture is prepared under an inert gas atmosphere from 150 parts of benzene, 1.3 parts of nickel acetylacetonate, 4 parts of tris-(2,4-dimethylphenyl)phosphite and 1.0 part of aluminum triethyl. The solution is transferred to a pressure vessel. Butadiene is passed in at 90° C. under a gauge pressure of 1.5 atmospheres. 450 parts of butadiene is reacted in the course of six hours. Analysis of the reaction product shows that 93.5% of the butadiene has been converted into cyclooctadiene-(1,5). 4-vinylcyclohexene-(1) is formed in a yield of 4.5%.

When working under analogous conditions but using the same amount of tris-(3,5-dimethylphenyl)phosphite instead of tris-(2,4-dimethylphenyl)phosphite, the yield of cyclooctadiene-(1,5) is only 75%. When using tris-(3,4-dimethylphenyl)phosphite, the yield of cyclooctadiene-(1,5) is 70.5%.

EXAMPLE 4

When working as in Example 3 but using 5.4 parts of tris-(o-diphenylyl)phosphite instead of tri-(2,4-dimethylphenyl)phosphite, cyclooctadiene-(1,5) is obtained in a yield of 94.5%.

EXAMPLE 5

A catalyst solution is prepared from 200 parts of benzene, 1.3 parts of nickel acetylacetonate, 6 parts of tri-o-tolyl phosphite and 1.7 parts of aluminum triethyl. The solution is transferred under an inert gas atmosphere to a pressure vessel provided with stirring means and butadiene is passed in at 90° C. under a gauge pressure of 1.5 atmospheres. 450 parts of butadiene is reacted within six hours. 22 parts of 4-vinylcyclohexene-(1) and 419 parts of cycloctadiene-(1,5) are obtained by the usual working up. The yield of the latter is 93% of the theory with reference to reacted butadiene.

EXAMPLES 6 TO 10

The catalyst in each case is prepared by reacting the components in a solvent and then butadiene-(1,3) is passed into the catalyst mixture at 85° to 95° C. under a gauge pressure of 1.5 atmospheres. The following results are obtained with a reaction period of five hours in each case.

In the following table, the columns are as follows:
A is the number of the example,
B is the solvent used,
C is the catalyst,
D is the conversion in parts of butadiene-(1,3) and
E is the yield of cyclooctadiene-(1,5) with reference to reacted butadiene-(1,3).

Table

| A | B | C | D | E |
|---|---|---|---|---|
| | | | | Percent |
| 6 | Benzene | 1.45 parts of nickel dimethyl glyoxime, 1.5 parts of n-butyl lithium, 4.5 parts of tri-o-chlorophenyl phosphite. | 180 | 84 |
| 7 | 1,4-dioxane | 0.65 part of nickel chloride, 2.7 parts of phenyl magnesium chloride, 8 parts of tri-(2-methoxyphenyl) phosphite. | 390 | 87 |
| 8 | Toluene | 1.2 parts of nickel carbonate, 2 parts of diisobutyl aluminum hydride, 9 parts of trithymyl phosphite. | 130 | 92 |
| 9 | Tetrahydrofurane. | 1.5 parts of nickel acetoacetate, 0.4 part of lithium aluminum hydride, 7.0 parts of tri-α-naphthyl phosphite. | 520 | 94 |
| 10 | do | 1.5 parts of nickel acetoacetate, 2 parts of diethyl aluminum chloride, 9 parts of tri-o-phenoxyphenyl phosphite. | 165 | 89 |

We claim:

1. In a process for the production of oligomers of butadiene-(1,3) wherein butadiene-(1,3) is converted into said oligomers at a temperature between 0 and 250° C. in the presence of a catalyst obtained by mixing (a) a member selected from the group consisting of salts and chelate complexes of the metals of the iron group of the Periodic System of Elements; (b) a compound selected from the group consisting of organometallic compounds and hydrides of elements of Groups IA, IIA, IIB and IIIA of the Periodic System of Elements; and (c) a phosphite, the improvement which comprises: using as component (c) a phosphite having at least one aryl radical which is substituted in o-position to the oxygen atom which is attached to the phosphorus atom.

2. In a process for the production of oligomers of butadiene - (1,3) wherein butadiene - (1,3) is converted into said oligomers at a temperature between 0 and 250° C. in the presence of a catalyst obtained by mixing (a) a member selected from the group consisting of salts and chelate complexes of the metals of the iron group of the Periodic System of Elements; (b) a compound selected from the group consisting of organo-metallic compounds and hydrides of elements of Groups IA, IIA, IIB and IIIA of the Periodic System of Elements; and (c) a phosphite, the improvement which comprises: using as component (c) a phosphite having at least one phenyl radical substituted in o-position to the oxygen atom which is attached to the phosphorus atom by a member selected from the group consisting of a hydrocarbon radical with 1 to 6 carbon atoms, halogen, alkoxy with 1 to 4 carbon atoms, aryloxy with 6 to 8 carbon atoms and a substituent which forms together with the carbon atom which it substitutes and the carbon atom in 3-position in relation to said oxygen atom a six-membered carbocyclic ring.

3. A process as set forth in claim 1 wherein the molar ratio of components (a) and (b) is between 1:0.5 and 1:20 and the molar ratio of the components (a) and (c) is between 1:1 and 1:6.

4. A process as set forth in claim 1 wherein the molar ratio of the components (a) and (c) is between 1:1 and 1:4.

References Cited by the Examiner

UNITED STATES PATENTS

| 2,686,208 | 8/1954 | Reed | 260—666 |
| 2,969,408 | 1/1961 | Nowlin et al. | 260—683.15 |
| 2,972,640 | 2/1961 | Burke et al. | 260—666 |
| 3,040,016 | 6/1962 | Balas et al. | 260—94.3 |

FOREIGN PATENTS

| 219,580 | 2/1962 | Austria. |

ALPHONSO D. SULLIVAN, *Primary Examiner.*

DANIEL E. WYMAN, LEONARD FORMAN,
*Examiners.*